(12) United States Patent
Kashiwagi

(10) Patent No.: US 9,860,497 B2
(45) Date of Patent: Jan. 2, 2018

(54) ILLUMINATION DEVICE AND PROJECTOR

(71) Applicant: SEIKO EPSON CORPORATION, Tokyo (JP)

(72) Inventor: Akihiro Kashiwagi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 17 days.

(21) Appl. No.: 15/040,641

(22) Filed: Feb. 10, 2016

(65) Prior Publication Data

US 2016/0241824 A1 Aug. 18, 2016

(30) Foreign Application Priority Data

Feb. 17, 2015 (JP) ................................. 2015-028779

(51) Int. Cl.
*G03B 21/20* (2006.01)
*H04N 9/31* (2006.01)
*G02B 5/02* (2006.01)

(52) U.S. Cl.
CPC ......... *H04N 9/3152* (2013.01); *G02B 5/0278* (2013.01); *G03B 21/208* (2013.01); *H04N 9/3161* (2013.01); *H04N 9/3164* (2013.01); *G02B 5/02* (2013.01)

(58) Field of Classification Search
CPC .............. G03B 21/2013; G03B 21/208; G03B 21/204; G03B 21/2053; H04N 9/3152; H04N 9/3161; H04N 9/3164; G02B 5/02–5/0294
See application file for complete search history.

(56) References Cited

U.S. PATENT DOCUMENTS

| 7,156,522 B2 * | 1/2007 | Plut ........................ G03B 21/16 353/31 |
| 7,972,009 B2 | 7/2011 | Yamauchi et al. |
| 8,354,790 B2 | 1/2013 | Iwanaga |
| 2012/0002173 A1 * | 1/2012 | Akiyama ........... G03B 21/2013 353/30 |

FOREIGN PATENT DOCUMENTS

| JP | 2008-096777 A | 4/2008 |
| JP | 2009-042372 A | 2/2009 |
| JP | 2009-277516 A | 11/2009 |
| JP | 2012-103615 A | 5/2012 |
| JP | 2013-061525 A | 4/2013 |

* cited by examiner

*Primary Examiner* — Ryan Howard
(74) *Attorney, Agent, or Firm* — Oliff PLC

(57) ABSTRACT

An illumination device includes a diffusion element and a light source device that emits a beam bundle including a first unit beam bundle to be incident on the diffusion element along a first direction and a second unit beam bundle to be incident on the diffusion element along a second direction. An angle formed by the first unit beam bundle with an optical axis of the beam bundle is greater than an angle formed by the second unit beam bundle with the optical axis, and the illumination device satisfies I2<I1 where I1 is a luminous flux of the first unit beam bundle, and I2 is a luminous flux of the second unit beam bundle.

10 Claims, 7 Drawing Sheets

ILLUMINATION DEVICE AND PROJECTOR

BACKGROUND

1. Technical Field

The present invention relates to an illumination a device and a projector.

2. Related Art

As one type of light source devices used for projectors, light source devices that irradiate a phosphor layer with laser light as excitation light to produce fluorescence at a wavelength different from the excitation light are proposed (e.g., see JP-A-2809-277516). A light source device disclosed in JP-A-2009-277516 has three fan-shaped segment areas on a circular transparent base. A red phosphor layer is provided in a first segment area, and red light is emitted from the first segment area. A green phosphor layer is provided in a second segment area, and green light is emitted from the second segment area. A diffusion layer is provided in a third segment area, and blue light as excitation light for the phosphor layers is emitted from the third segment area.

In the light source device disclosed in JP-A-2009-277516, the red light, the green light, and the blue light are emitted from the three segment areas in a time division manner. However, a light distribution is different between the fluorescence emitted from the phosphor layer and the diffused light emitted from the diffusion layer. That is, the red light (fluorescence) and the blue light (diffused light) have different light distributions, and the green light (fluorescence) and the blue light (diffused light) have different light distributions. Specifically, the light distribution of the diffused light is narrower than the light distribution of the fluorescence. As a result, color unevenness may occur due to the difference in light distribution.

In order to solve this problem, a method is considered in which a diffusion layer with a high diffusing power is used to expand the light distribution of the diffused light to thereby align the light distribution of the diffused light with the light distribution of the fluorescence. However, the diffusion layer with a high diffusing power has drawbacks such as much backscattering and difficulty in forming a diffusion layer with excellent characteristics. Therefore, the use of the diffusion layer with a high diffusing power gives rise to the problem that light use efficiency is reduced due to the drawbacks.

SUMMARY

An advantage of some aspects of the invention is to implement an illumination device capable of expanding a light distribution of diffused light while reducing a reduction in light use efficiency. Another advantage of some aspects of the invention is to implement, by including the illumination device, a projector with, less probability of troubles such as color unevenness and having excellent display quality.

An illumination device according to an aspect of the invention includes: a diffusion element and a light source device that emits a beam bundle including a first unit beam bundle to be incident on the diffusion element along a first direction and a second unit beam bundle to be incident on the diffusion element along a second direction, wherein an angle formed toy the first unit beam bundle with an optical axis of the beam bundle is greater than an angle formed by the second unit beam bundle with the optical axis, and the following expression is satisfied: $I2<I1$ where $I1$ is a luminous flux of the first unit beam bundle, and $I2$ is a luminous flux of the second unit beam bundle.

In the illumination device according to the aspect of the invention, an angular distribution of intensity of the beam bundle incident on the diffusion element shows a low value at the center and high values at the periphery. As a result, compared to the case where a beam bundle whose angular distribution of intensity has a high peak at the center is incident, the angular distribution of intensity of the beam bundle emitted from the diffusion element can be expanded. Since the angular distribution can be expanded without enhancing diffusion characteristics of the diffusion element, backscattering is reduced, and thus a reduction in light use efficiency can be reduced.

In the illumination device according to the aspect of the invention, the beam bundle having passed through the diffusion element may include a third unit be a bundle traveling along the first direction and a fourth unit beats bundle traveling along the second direction, and the following expression may be satisfied: $I1/I2>I3/I4$ where $I3$ is a luminous flux of the third unit beam bundle, and $I4$ is a luminous flux of the fourth unit beam bundle.

According to this configuration, when the above condition: is satisfied in a transmissive diffusion element, an angular distribution of intensify of the beam bundle emitted from the diffusion element is gentler than an angular distribution of intensity of the beam bundle incident on the diffusion element.

An intensity of light traveling in the second direction may be maximum in an angular distribution of intensity of the beam bundle having passed through the diffusion element.

According to this configuration, diffusion close to Lambert diffusion is obtained.

In the illumination device according to the aspect of the invention, the beam bundle reflected by the diffusion element may include a third unit beam bundle traveling in a specular direction of the first unit beam bundle and a fourth unit beam bundle traveling in a specular direction of the second unit beam bundle, and the following expression may be satisfied: $I1/I2>I3/I4$ where $I3$ is a luminous flux of the third unit beam bundle, and $I4$ is a luminous flux of the fourth unit beam bundle.

According to this configuration, when the above condition is satisfied in a reflective diffusion element, an angular distribution of intensity of the beam bundle emitted from the diffusion element is gentler than an angular distribution of intensity of the beam bundle incident on the diffusion element.

An intensity of light traveling in the specular direction of the second unit beam bundle may be maximum in an angular distribution of intensity of the beam bundle reflected by the diffusion element.

According to this configuration, diffusion close to Lambert diffusion is obtained.

A projector according to an aspect of the invention includes: the illumination device according to the aspect of the invention; a light modulator that modulates, in response to image information, light emitted from the illumination device to thereby form image light; and a projection optical system that projects the image light.

In the projector according to the aspect of the invention, the illumination device according to the aspect of the invention is included. Therefore, when the illumination device is combined with another illumination device, a difference in light distribution between the illumination device according to the aspect of the invention and another illumination device is reduced, and thus color unevenness can be reduced. Due to this, it is possible to implement the projector having excellent display quality.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be described with reference to FIGS. 1 to 8B.

In the embodiment, a projector in which laser light sources as solid-state light sources are used for all of an illumination device for red light, an illumination device for green light, and an illumination device for blue light will be described by way of example.

Even when all of a plurality of illumination devices include solid-state light sources, a light distribution is different between different colored lights, and color unevenness may occur due to the difference in light distribution. In such a case, the illumination device according to the invention is suitably used.

Figure 1:
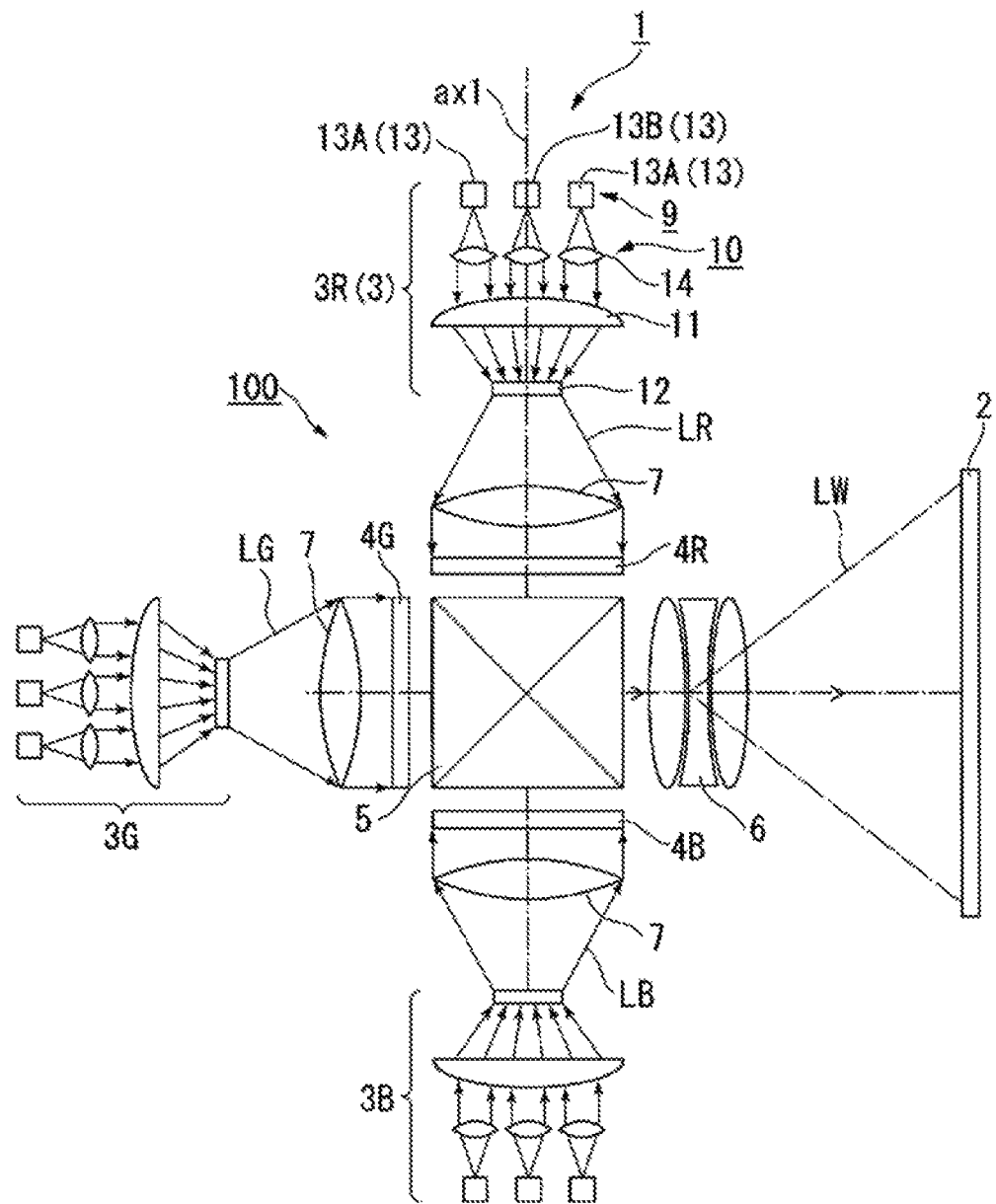
FIG. 1 is a schematic configuration diagram showing a projector according to a first embodiment of the invention.

FIG. 1 is a schematic configuration diagram showing the projector according to the first embodiment.

In the drawings below, the components may be shown in different dimension scales for the sake of clarity of each component.

As shown in FIG. 1, the projector 1 is a projection-type image display device that displays a color video on a screen 2 (projected surface). The projector 1 includes, as light modulators, three liquid crystal light valves corresponding to respective colored lights: red light LR, green light LG, and blue light LB, Further, the projector 1 includes, as light source devices of illumination devices, semiconductor lasers that emit high-luminance, high-output light.

Specifically, the projector 1 roughly includes an illumination device 3R for red light, an illumination device 3G for green light, an illumination device 3B for blue light, a light modulator 4R for red light, a light modulator 4G for green light, a light modulator 4B for blue light, a combining optical system 5, and a projection optical system 6.

The illumination device 3E for red light emits the red light LR. The illumination device 3G for green light emits the green light LG. The illumination device 3B for blue light emits the blue light LB. The light modulator 4R for red light modulates the red light LR emitted from the illumination device 3R for red light. The light modulator 4G for green light modulates the green light LG emitted from the illumination device 3G for green light. The light modulator 4B for blue light modulates the blue light LB emitted from the illumination device 3B for blue light. The combining optical system 5 combines the red light LR, the green light LG, and the blue light LB modulated by the light modulator 4R for red light, the light modulator 4G for green light, and the light modulator 4B for blue light. The projection optical system 6 projects light (image light) LW combined by the combining optical system 5 onto the screen 2.

The illumination device 3R for red light, the illumination device 3G for green light, and the illumination device 3B for blue light have basically the same configuration excepting that the illumination devices use, as light source devices, semiconductor lasers that respectively emit laser lights corresponding to the red light LE, the green light LG, and the blue light LB. The illumination device 3R for red light emits the red light LR onto the light modulator 4E for red light. Similarly, the illumination device 3G for green light emits the green light LG onto the light modulator 4G for green light. The illumination device 3B for blue light emits the blue light LB onto the light modulator 4B for blue light.

A field lens 7 is provided between the illumination device 3R for red light and the light modulator 4R for red light. The field lens 7 collimates the light emitted from the illumination device 3R for red light and causes the light to be incident on the light modulator 4R for red light. Similarly, a field lens 7 is provided between the illumination device 3G for green light and the light modulator 4G for green light. A field lens 7 is provided between the illumination device 3B for blue light and the light modulator 4B for blue light.

Each of the light modulator 4R for red light, the light modulator 4G for green light, and the light modulator 4B for blue light includes, for example, a transmissive liquid crystal panel as a light modulation element. The light modulator 4R for red light modulates the red light LR in response to image information corresponding to the red light LR, to thereby form red image light. Similarly, the light modulator 4G for green light modulates the green light LG in response to image information corresponding to the green light LG, to thereby form green image light. The light modulator 4B for blue light modulates the blue light LB in response to image information corresponding to the blue light LB, to thereby form blue image light. A polarizer (not shown) is provided on each of the incident and exiting sides of the liquid crystal panel.

The combining optical system 5 is composed of a cross dichroic prism. The combining optical system 5 combines the red image light, green image light, and blue image light that are incident thereon, and emits the combined image light LW toward the projection optical system 6.

The projection optical system 6 is composed of a projection lens group including a plurality of lenses. The projection optical system 6 enlarges and projects the image light LW combined by the combining optical system 5 onto the screen 2. Due to this, an enlarged color video is displayed on the screen 2.

Illumination Device

Hereinafter, a specific configuration of the illumination device 3R for red light, the illumination device 3G for green light, and the illumination device 3B for blue light will be described.

As described above, the illumination device 3R for red light, the illumination device 3G for green light, and the illumination device 3B for blue light have basically the same configuration excepting that the illumination devices include the semiconductor lasers corresponding to the respective colors. Hence, the illumination device 3R for red light will be described below in which the illumination device 3R for red light is simply referred to as illumination device 3".

As shown in FIG. 1, the illumination device 3 includes a light source device s, a collimator optical system 10, a condensing optical system 11, and a diffusion element 12. The light source device 9 has a configuration in which a plurality of semiconductor lasers 13 are arranged in an array in a plane orthogonal to an illumination axis ax1. The semiconductor laser 13 emits coherent linearly polarized light. The illumination optical axis ax1 is defined as the central axis of the light emitted from the illumination device 3.

The collimator optical system 10 includes the same number of collimator lenses 14 as the semiconductor lasers 13. The plurality of collimator lenses 14 is provided corresponding to the respective semiconductor lasers 13. The light emitted from the semiconductor laser 13 is collimated by the collimator lens 14 and emitted from the light source device 9. Hence, the light emitted from the light source device 9 includes a plurality of lights emitted from the plurality of semiconductor lasers 13. In the following description, the light emitted from the light source device 9, that is, a bundle of a plurality of beams emitted from the plurality of semiconductor lasers 13 is referred to as "beam bundle emitted from the light source device 9".

The condensing optical system 11 is provided on an optical path between the light source device 9 and the diffusion element 12. The condensing optical system 11 concentrates the beam bundle emitted from the light source device 9 and causes the beam bundle to be incident on the diffusion element 12. Although the condensing optical system 11 is composed of one convex lens in the embodiment, a specific configuration of the condensing optical system 11 or the number of condensing optical systems 11 may be appropriately changed.

The diffusion element 12 transmits, while diffusing, the beam bundle emitted from the light source device 9 and incident on the diffusion element 13 through the condensing optical system 11. That is, the diffusion element 12 according to the embodiment is a transmissive diffusion element. An angular distribution of intensity of the beam bundle incident on the diffusion element 12 is expanded by transmission of the beam bundle through the diffusion element 12. As the diffusion element 12, for example, a general diffusion element, such as a diffusion element obtained by forming minute irregularities on the surface of a light-transmissive plate, or a diffusion element obtained by dispersing, in a light-transmissive plate, fine particles having a different refractive index from that of the plate, can be used.

Figure 2:
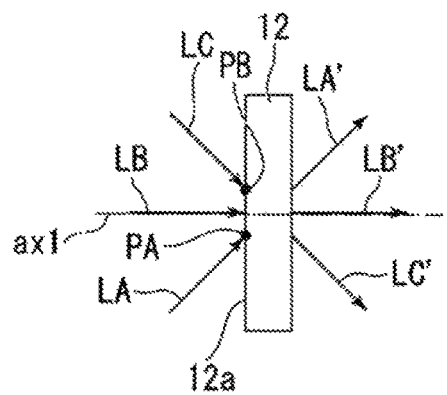
FIG. 2 shows a plurality of sub-beam bundles incident on a diffusion element and a plurality of sub-beam bundles emitted from the diffusion element.

FIG. 2 shows sub-beam bundles incident on the diffusion element 12 and sub-beam trundles emitted from the diffusion element 12.

While the beam bundle is composed of the plurality of beams emitted from the plurality of semiconductor lasers 13 in the embodiment, the beam bundle may be composed of one beam emitted from one semiconductor laser. In any case, the beam bundle can be deemed as being composed of a plurality of sub-beam bundles. The beam, bundle is vertically incident on the diffusion element 12.

The plurality of sub-beam bundles include a first sub-beam bundle $L_A$, a second sub-beam bundle $L_B$, and a third sub-beam bundle $L_C$. Here, consider a unit sphere centered at an incident position PA, which is an incident position of the first sub-beam bundle $L_A$ on the diffusion element 12, and having a radius with a unit length. The first sub-beam bundle $L_A$ is a beam bundle whose cross-section based on the unit sphere has a unit area. Similarly, consider a unit sphere centered at an incident position PB, which is an incident position of the second sub-beam bundle $L_B$ on the diffusion element 12, and having a radius with a unit length. The second sub-beam bundle $L_B$ is a beam bundle whose cross-section based on the unit sphere has a unit area. In the specification, therefore, the first sub-beam bundle $L_A$ and the second sub-beam bundle $L_B$ are sometimes referred to as "first unit beam bundle" and "second unit beam bundle", respectively. Similarly, the third sub-beam bundle $L_C$ is sometimes referred to as "third unit beam bundle".

A direction along which the first sub-beam bundle $L_A$ enters the diffusion element 12 is defined as a first direction, and a direction along which the second sub-beam bundle $L_B$ enters the diffusion element 12 is defined as a second direction.

The light source device 9 includes three semiconductor lasers 13. The first sub-beam bundle $L_A$ and the third sub-beam bundle $L_C$ originate from lights emitted from the semiconductor lasers 13A and 13C at both sides. The second sub-beam bundle $L_B$ originates from light emitted from the semiconductor laser 13B at the center. The first sub-beam bundle $L_A$ and the third sub-beam bundle $L_C$ constitute a peripheral portion of the beam bundle, while the second sub-beam bundle $L_B$ constitutes a central portion of the beam bundle.

As shown in FIG. 2, the first sub-beam bundle $L_A$ and the third sub-beam, bundle $L_C$ are obliquely incident on a light-incident-side surface 12a of the diffusion element 12 by the action of the condensing optical system 11. The second sub-beam bundle $L_B$ is vertically incident on the surface 12a. That is, an angle formed by the first sub-beam bundle $L_A$ with the optical axis ax1 of the beam bundle and an angle formed by the third sub-beam bundle $L_C$ with the optical axis ax1 are greater than an angle formed by the second sub-beam trundle $L_B$ with the optical axis ax1. An incident angle of the first sub-beam bundle $L_A$ and an incident angle of the third sub-beam bundle $L_C$ are greater than an incident angle of the second sub-beam bundle $L_B$.

When the light source device 9 is composed of the plurality of semiconductor lasers 13, a plurality of beams emitted from the plurality of semiconductor lasers 13 are incident on the diffusion element 12. If the cross-sectional areas of the respective beams are equal to each other when the beam bundle is incident on the diffusion element, a beam that forms a relatively great angle with the optical axis of the beam bundle among the plurality of beams is deemed as the first unit beam bundle, and a beam that forms a relatively small angle with the optical axis of the beam bundle is deemed as the second unit beam bundle. When three semiconductor lasers 13 are used as in the embodiment, a beam emitted from the semiconductor laser 13A is deemed as the first unit beam bundle, and a beam emitted from the semiconductor laser 13B is deemed as the second unit beam bundle.

For simplifying description, it is assumed that the incident angle of the first sub-beam bundle $L_A$ is equal to the incident angle of the third sub-beam bundle $L_C$. In this case, there is no need to distinguish the first sub-beam bundle $L_A$ from the third sub-beam bundle $L_C$, and therefore, a description will be given below with reference to the first sub-beam bundle $L_A$ and the second sub-beam bundle $L_B$.

In the embodiment, by controlling an angular distribution of intensity of a beam bundle to be incident on the diffusion element 12, an angular distribution of intensity of the beam bundle after passing through the diffusion element 12 can be expanded. Specifically, Formula (1) is satisfied.

$$I2 < I1 \quad (1)$$

where I1 is the intensity of the first sub-beam bundle $L_A$ upon incidence of the beam bundle on the diffusion element 12, and I2 is the intensity of the second sub-beam bundle $L_B$ upon incidence of the beam bundle on the diffusion element 12.

In order to achieve such an intensity level relation, outputs of the semiconductor lasers 13A and 13C are set to be greater than an output of the semiconductor laser 13B. Alternatively, the number of semiconductor lasers 13 may be further increased to make the arrangement density of semiconductor lasers 13 at the peripheral portion higher than the arrangement density of semiconductor lasers 13 at the central portion. When this method is adopted, the intensities of output lights of all of the semiconductor lasers 13 may be equal to one another.

Another way to phrase the above condition is that the beam bundle includes the first unit beam bundle whose intensity is higher than the second unit beam bundle and which satisfies the formula θ1>θ2 where θ1 is the angle formed by the first unit beam bundle with the optical axis ax1, and θ2 is the angle formed by the second unit beam bundle with the optical axis ax1.

Figure 3:
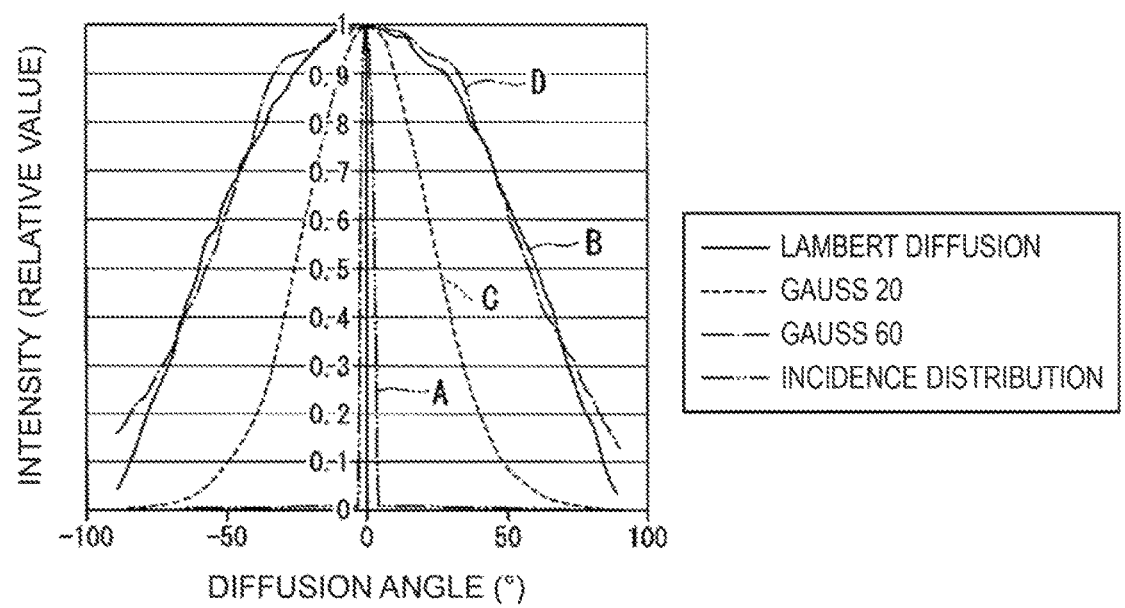
FIG. 3 is a graph showing a diffuse angular distribution in a related art.

FIG. 3 is a graph showing a diffuse angular distribution in a related art. The horizontal axis in FIG. 3 represents the diffusion angle (°), while the vertical axis in FIG. 3 represents the intensity (relative value).

As shown by the dashed-double dotted line A in FIG. 3, it is assumed that, for example, incident light having a narrow angular distribution with an angular width within ±5° is incident on the diffusion element. If the diffusion element produces ideal Lambert diffusion, light emitted from the diffusion element is converted into diffused light having a wide angular distribution as shown by the solid line B.

However, an actual diffusion element does not produce the ideal Lambert diffusion but produces diffusion according to a predetermined Gaussian distribution. When the diffusion element has a small diffusion characteristic, the diffusion element exhibits, as shown by the broken line C, an angular distribution far apart from the Lambert diffusion. The diffusion element needs to have a sufficiently large diffusion characteristic in order to obtain an angular distribution substantially coincident with the Lambert diffusion as shown by the dash-dotted line D. However, the diffusion element having a large diffusion characteristic has drawbacks such as much backscattering, and thus it is difficult to obtain diffused light having a wide angular distribution.

The numerical value x in "Gauss X" such as "Gauss 20" or "Gauss 60" in FIG. 3 represents parameters in angular distribution simulations performed by the present inventor. The larger numerical value indicates a higher diffusion characteristic of the diffusion element.

In contrast, in the illumination device 3 according to the embodiment, the intensity or the second sub-beam bundle $L_B$ upon incidence of the beam bundle on the diffusion element 12 is lower than the intensity of the first sub-beam bundle $L_A$.

Figure 4:
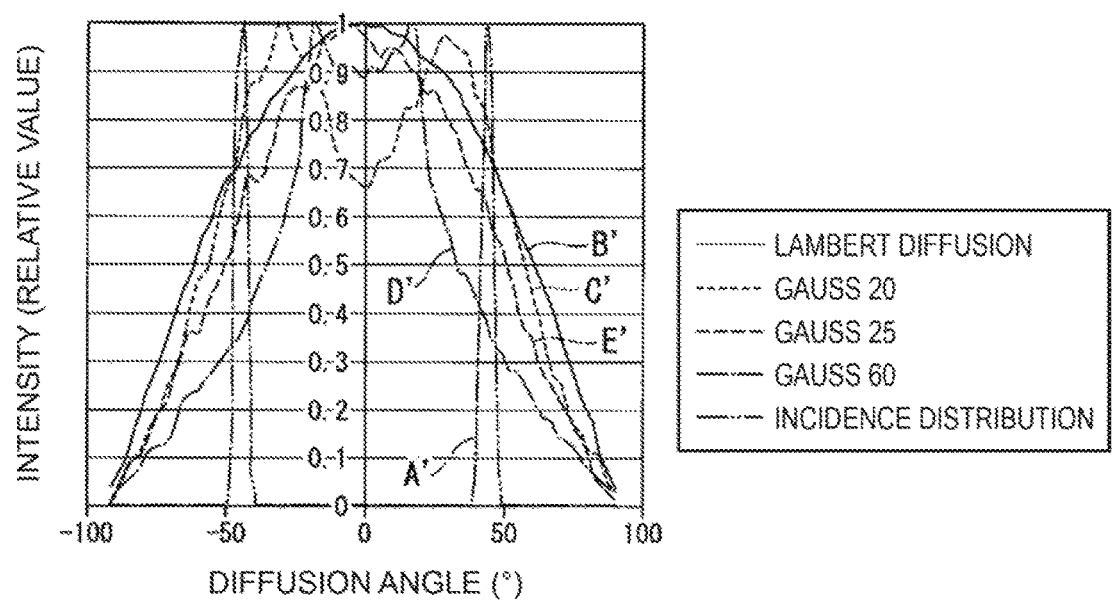
FIG. 4 is a graph showing a diffuse angular distribution according to the embodiment.

FIG. 4 is a graph showing results of angular distribution simulations in the embodiment. The horizontal axis in FIG. 4 represents the diffusion angle (°), while the vertical axis in FIG. 4 represents the intensity (relative value).

Here, the intensity of the first sub-beam bundle is 1, and the intensity of the second sub-beam bundle is 0. It is assumed that the first sub-beam bundle includes two sub-beam bundles having an angular distribution with an angular width of about ±5° and incident at incident angles of about +50° and about −50°.

In the related art of FIG. 3, when the diffusion element has a large diffusion characteristic of about "Gauss 60", the angular distribution substantially coincident with the Lambert diffusion is obtained. In contrast, it is found in the embodiment of FIG. 4 that angular distributions close to Lambert diffusion shown by the solid line B' are obtained using a diffusion element having small diffusion, characteristics of about "Gauss 20" or "Gauss 25" as shown by the broken lines C' and E'. Since the diffusion element exhibits less backscattering as the diffusion characteristic of the diffusion element is smaller, light use efficiency can be increased. In the simulations, as shown by the dash-dotted line D' the diffusion element rather exhibits a characteristic apart from the Lambert diffusion when a diffusion characteristic is as large as about "Gauss 60". It is found also from this point of view that a diffusion characteristic should not be large.

The reason that a diffuse angular distribution can be expanded by making the intensity of the second sub-beam bundle $L_B$ upon incidence of the beam bundle on the diffusion element, lower than the intensity of the first sub-beam bundle $L_A$ will foe described with reference to FIGS. 5 to 6C.

Figure 6A:
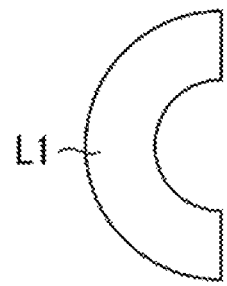
FIGS. 6A to 6C show images of an incident angular distribution of a beam bundle incident on the diffusion element.
Figure 6B:
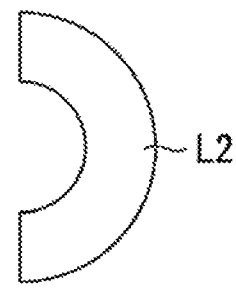
Figure 6C:
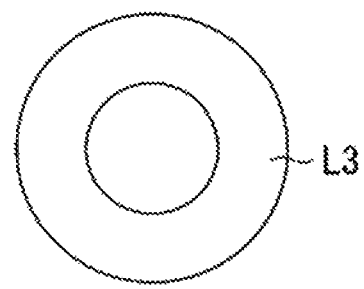

When the intensity of the first sub-beam bundle is 1 and the intensity of the second sub-beam bundle is 0 as in the simulations described above, an intensity distribution of the beam bundle as seen in a cross-section vertical to the optical axis ax1 of the beam bundle is an intensify distribution L3 having an annular ring shape shown in FIG. 6C. Consider that the intensity distribution L3 is separated into an intensity distribution L1 of the left half of the annular ring shown in FIG. 6A and an intensity distribution L2 of the right half of the annular ring shown in FIG. 6B.

Figure 5:
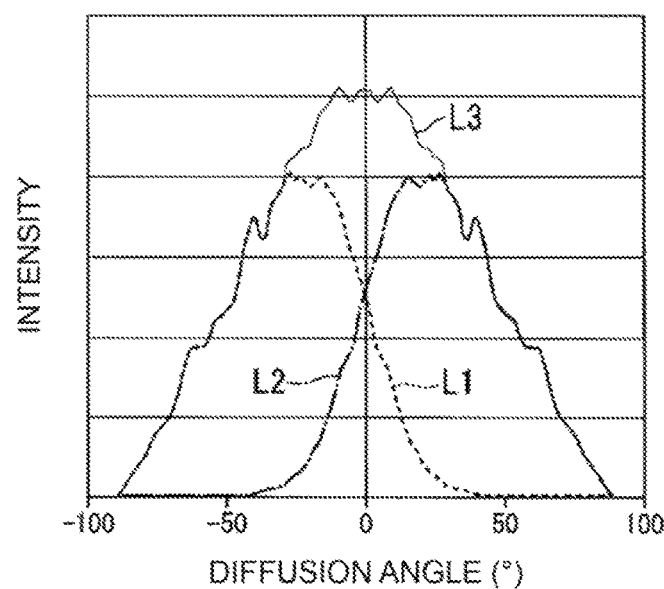
FIG. 5 is a graph for explaining the principles of the invention.

When a beam bundle having the intensity distribution L1 in FIG. 6A is incident on the diffusion element, an angular distribution having a peak at a diffusion angle of about −30° is obtained as shown by the broken line L1 in FIG. 5. Similarly, when a beam bundle having the intensity distribution L2 in FIG. 6B is incident on the diffusion element, an angular distribution having a peak at a diffusion angle of about +30° is obtained as shown by the dash-dotted line L2 in FIG. 5. The amount of light emitted from the diffusion element at a certain angle is the sum of the amounts of diffused lights originating from sub-beam bundles incident at various angles. Hence, when the beam bundle having the intensity distribution L3 in the annular ring shape shown in FIG. 6C is incident on the diffusion element, an intensity distribution obtained by combining the intensity distribution L1 with the intensity distribution L2 is obtained as shown by the solid line L3 in FIG. 5. By combining the diffused lights originating from the plurality of sub-beam bundles incident from different directions from each other as described above, a diffuse angular distribution can be expanded compared to the case of using a beam bundle having a simple circular intensity distribution as in the related art.

Although the intensity of the second sub-beam bundle is 0 in the embodiment, the invention is not limited to this value.

Figure 7:
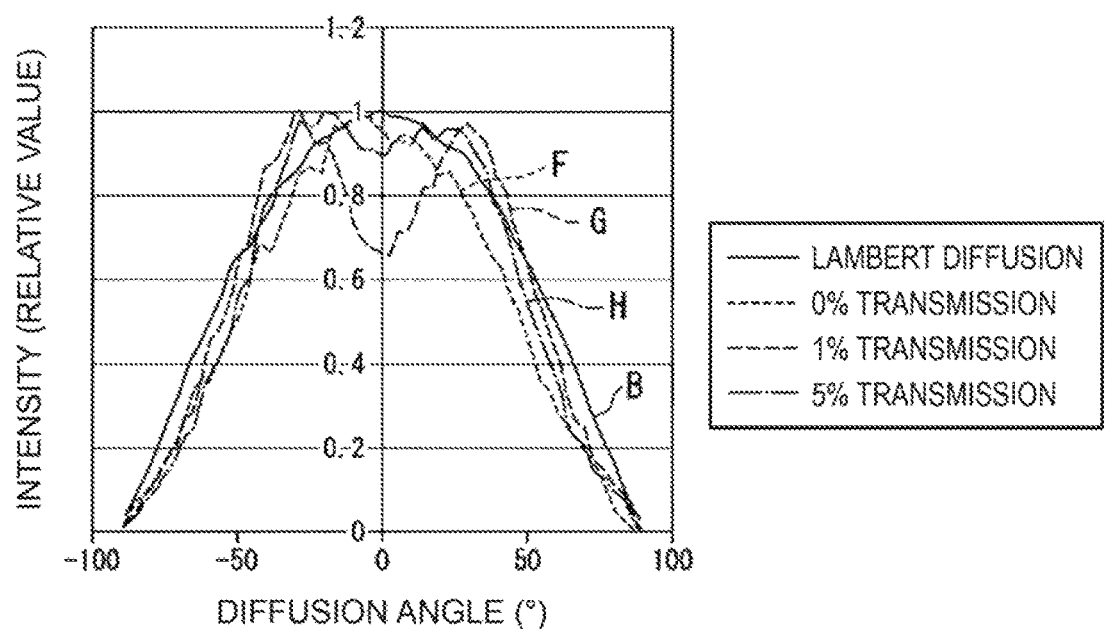
FIG. 7 is a graph showing a diffuse angular distribution obtained when the incident angular distribution is changed.

FIG. 7 shows a diffuse angular distribution obtained when the intensity of the second sub-beam bundle is changed. The horizontal axis in FIG. 7 represents the diffusion angle (°), while the vertical axis in FIG. 7 represents the intensity (relative value). In FIG. 7, the broken line F representing "0% transmission" means that the intensity of the second sub-beam bundle is 0. The broken line G representing "1% transmission" means that the intensity of the second sub-beam bundle is 1% of the intensity of the entire beam bundle. The dash-dotted line H representing "5% transmission" means that the intensity of the second sub-beam bundle is 5% of the intensity of the entire beam bundle.

As shown in FIG. 7, the diffuse angular distribution can be appropriately adjusted by changing the proportion of the intensify of the second sub-beam bundle to the intensity of the entire beam bundle, in other words, by changing the ratio of the intensity of the first sub-beam bundle to the intensity of the second sub-beam bundle.

As shown in FIG. 2, the beam bundle having passed through the diffusion element 12 includes a fourth sub-beam bundle (fourth unit beam bundle) $L_A'$, a fifth sub-beam bundle (fifth unit beam bundle) $L_B'$, and a sixth sub-beam bundle (sixth unit beam bundle) $L_C'$. The fourth sub-beam trundle $L_A'$ travels along the first direction, and the fifth sub-beam bundle $L_B'$ travels along the second direction. Also in this case, there is no need to distinguish the fourth sub-beam bundle $L_A'$ from the sixth sub-beam bundle $L_C'$, and therefore, a description will be given with reference to the fourth sub-beam bundle and the fifth sub-beam bundle $L_B'$.

It is preferable to satisfy Formula (2).

$$I1/I2 > I3/I4 \quad (2)$$

where I3 is the intensity of the fourth sub-beam bundle $L_A'$, and I4 is the intensity of the fifth sub-beam bundle $L_B'$.

Due to this, an angular distribution of intensity of a beam bundle emitted from the diffusion element 12 can be gentler than an angular distribution of intensity of a beam bundle incident on the diffusion element 12.

Moreover, in the angular distribution of intensity of the beam bundle having passed through the diffusion element 12, the light traveling in the second direction, that is, the light emitted vertically from the diffusion element 12 may have a maximum intensity. According to this configuration, diffusion close to Lambert diffusion is obtained.

Figure 8A:
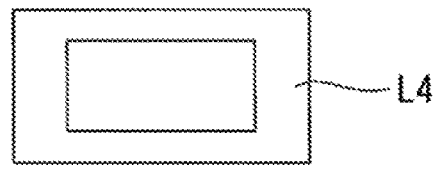
FIGS. 8A and 8B show images of another incident angular distribution of the beam bundle incident on the diffusion element.
Figure 8B:
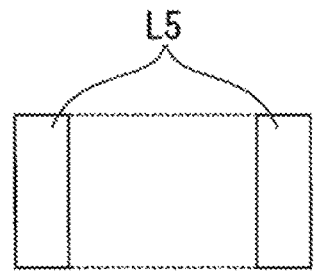

Although the beam bundle having the intensity distribution L3 in the annular ring shape shown in FIG. 6C is used in the embodiment, the shape of the intensity distribution may not necessarily be the annular ring shape. As shown in FIG. 8A for example, the intensity distribution of the beam bundle as seen in a cross-section vertical to the central axis of the beam bundle may be an intensity distribution L4 having a rectangular ring shape. Alternatively, an area where the intensity shows finite values may not entirely surround an area where the intensity is 0. As shown in FIG. 8B for example, the intensity distribution may be an intensity distribution L5 in which the area where the intensity shows finite values is divided into multiple areas. Moreover, as described above, the intensity in a rectangular portion at the center may not necessarily be 0 in FIGS. 8A and 8B. In any case, it is sufficient that the beam, bundle includes the first unit beam bundle whose intensity is higher than the second unit beam bundle and which satisfies the formula θ1>θ2.

The projector 1 according to the embodiment includes the illumination device 3 capable of adjusting the light distribution by changing the intensity distribution of the beam bundle incident on the diffusion element 12. The light distribution may be different in each of illumination devices due to, for example, wavelength dispersion of various types of optical systems or a difference in the degree of degradation between semiconductor lasers of different colors. Even in such a case, the light distributions of lights emitted from the plurality of illumination devices can be aligned in the end. Due to this, it is possible to implement a projector with less color unevenness and having excellent display quality.

Second Embodiment

Hereinafter, a second embodiment of the invention will be described with reference to FIGS. 9 and 10.

In the embodiment, a projector including an illumination device that emits illumination light composed of fluorescence and diffused light will be described by way of example.

The fluorescence and the diffused light have basically different light distributions, so that color unevenness may occur due to the difference in light distribution. In such a case, the illumination device according to the invention is suitably used.

Figure 9:
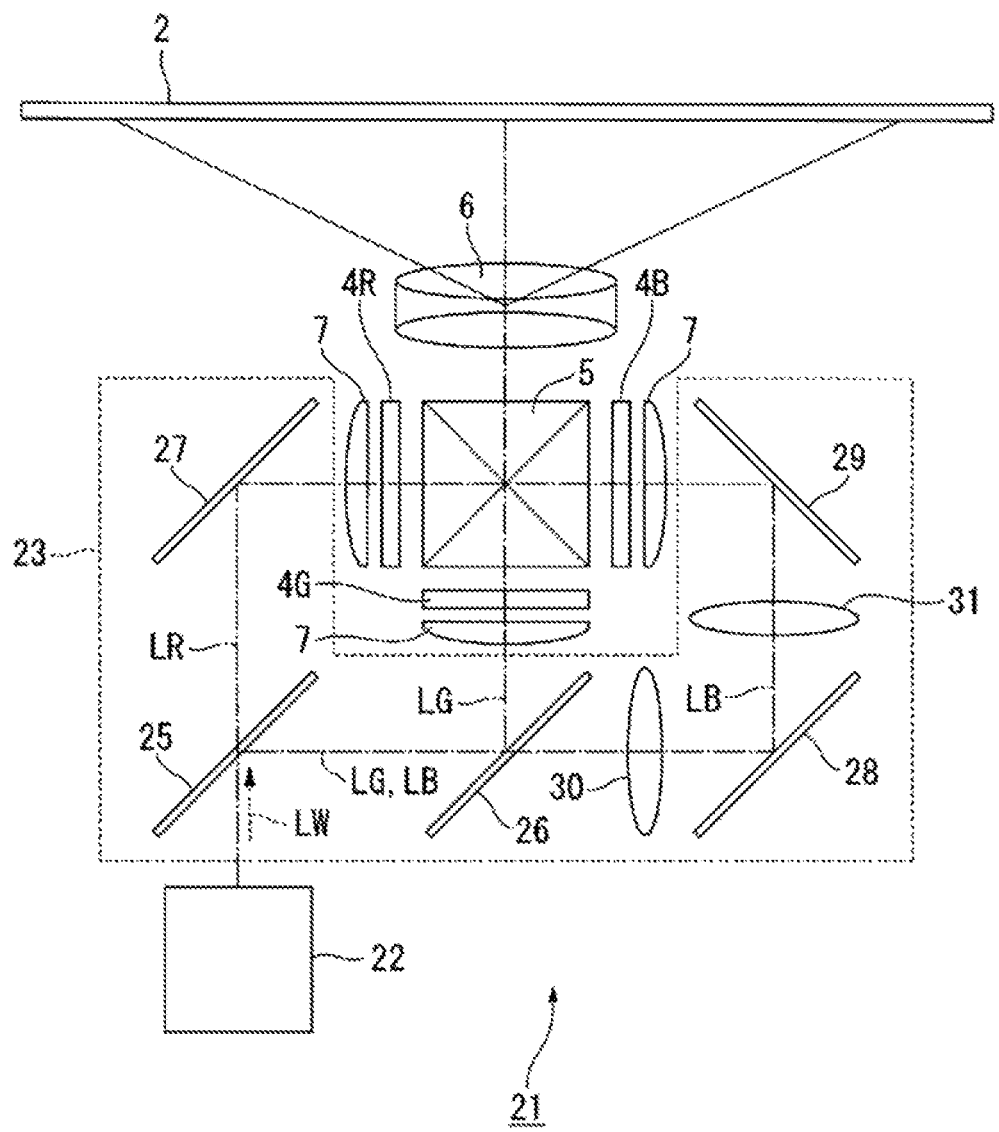
FIG. 9 is a schematic configuration diagram showing a projector according to a second embodiment of the invention.

FIG. 9 is a schematic configuration diagram showing the projector according to the second embodiment.

Figure 10:
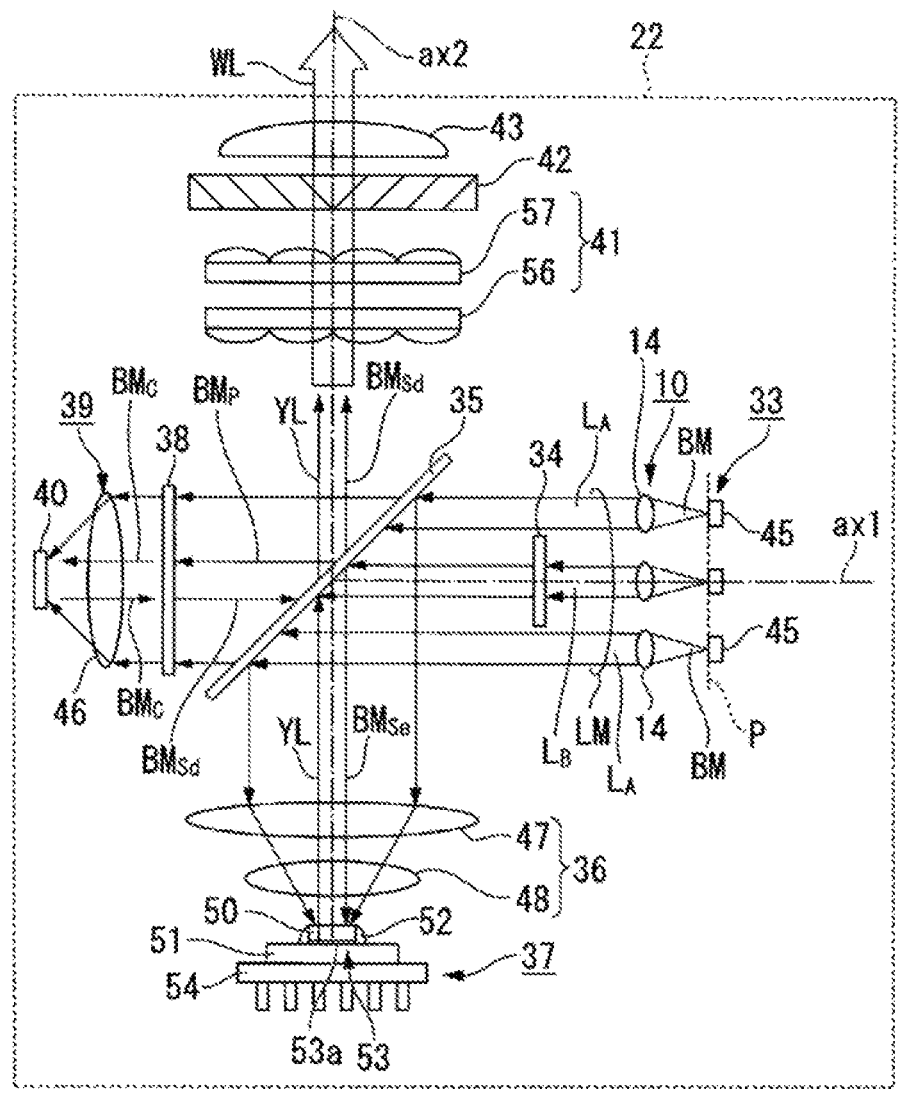
FIG. 10 is a schematic configuration diagram of an illumination device used in the projector according to the second embodiment.

FIGS. 9 and 10, components common to those m the drawings used in the first embodiment are denoted by the same reference and numeral signs, and a description thereof is omitted.

As shown in FIG. 9, the projector 21 includes an illumination device 22, a color separation optical system 23, the light modulator 4R for red light, the light modulator 40 for green light, the light modulator 4B for blue light, the combining optical system 5, and the projection optical system 6. The configurations of the light modulator 4R for red light, the light modulator 4G for green light, the light modulator 4B for blue light, the combining optical system 5, and the projection optical system 6 are similar to those of the first embodiment, and a description thereof is omitted.

The color separation optical system 23 separates the white light. LW emitted from the illumination device 22 into the red light LR, the green light LG, and the blue light LB. The color separation optical system 23 roughly includes a first dichroic mirror 25, a second dichroic mirror 26, a first total reflection mirror 27, a second total reflection mirror 28, a third total reflection mirror 39, a first relay lens 30, and a second relay lens 31.

The first dichroic mirror 25 separates the illumination light LW emitted from the illumination device 22 into the red light LR and the other light (the green light LG and the blue light LB). The first dichroic mirror 25 transmits the separated red light LR and reflects the other light (the green light LG and the blue light LB). On the other hand, the second dichroic mirror 26 separates the light reflected by the first dichroic mirror 25 into the green light LG and the blue light LB, The second dichroic mirror 26 reflects the separated green light LG and transmits the blue light LB.

The first total reflection mirror 27 is disposed on the optical path of the red light LR, and reflects the red light LR having passed through the first dichroic mirror 25 toward the light modulator 4R for red light. On the other hand, the second total reflection mirror 28 and the third total reflection mirror 29 are disposed on the optical path of the blue light LB, and direct the blue light LB having passed through the second dichroic mirror 26 to the light modulator 4B for blue light. The green light LG is reflected from the second dichroic mirror 26 toward the light modulator 4G.

The first relay lens 30 and the second relay lens 31 are disposed on the light-incident and light-exiting sides of the second total reflection mirror 28 on the optical path of the blue light LB. The first relay lens 30 and the second relay lens 31 have a function of compensating for light loss of the blue light LB due to the fact that the optical path length of the blue light LB is longer than the optical path length of the red light LR or the green light LG.

Illumination Device

As shown in FIG. 10, the illumination device 22 includes a light source device 33, the collimator optical system 10, a first retardation film 34, a polarization separation element 35, a first pickup optical system 36, a fluorescent light-emitting element 37, a second retardation film 38, a second pickup optical system 39, a diffusion element 40, an integrator optical system 41, a polarization conversion element 42, and a superimposing optical system 43.

The light source device 33, the collimator optical system 10, the first retardation film 34, the polarization, separation element 35, the second retardation film 38, the second pickup optical system 39, and the diffusion element 40 are successively disposed nest to one another on the optical axis ax1. On the other hand, the fluorescent light-emitting element 37, the first pickup optical system 36, the polarization separation element 35, the integrator optical system 41, the polarization conversion element 42, and the superimposing optical system 43 are successively disposed next to one another on an optical axis ax2. The optical axis ax1 and the optical axis ax2 lie in the same plane and are orthogonal to each other.

The light source device 33 includes a plurality of semiconductor lasers 45. The plurality of semiconductor lasers 45 are disposed in an array in a plane P orthogonal to the optical axis ax1. The semiconductor laser 45 emits a light beam BM composed of blue light. The semiconductor laser 45 emits, as blue light, laser light having, for example, a peak wavelength of 460 nm. The light beam BM is linearly polarized light. The light beams BM are emitted from the light source device 33 toward the polarization separation element 35.

As will be described later, a portion of the light beam BM is separated by the polarization separation element 35 and serves as excitation light for a phosphor, and another portion serves as blue light for image display. The plurality of light beams BM emitted from the light source device 33 are incident on the collimator optical system 10. The collimator optical system 10 converts the light beam BM into parallel light. Similarly to the first embodiment, the whole of the plurality of light beams BM emitted from the light source device 33 corresponds to a beam bundle.

A component at the central portion of a beam bundle LM emitted from, the collimator optical system 10 is incident on the first retardation film 34. A component at the peripheral portion of the beam bundle LM is not incident on the first retardation film 34. That is, the first sub-beam bundle (first unit beam bundle) $L_A$ of the beam bundle LM is not incident on the first retardation film 34, while the second sub-beam bundle (second unit beam bundle) $L_B$ is incident on the first retardation film 34. Due to this, the polarization state of the first sub-beam bundle can be different from the polarization state of the second sub-beam bundle $L_B$.

Specifically, it is assumed that the light beam emitted from the semiconductor laser 45 is P-polarized with respect to the polarization, separation, element 35. In this case, if the fast axis or slow axis of the first retardation film 34 is disposed so as to form an angle of 45° with respect to the polarization axis of P-polarized light, the first sub-beam bundle $L_A$ that does not pass through the first retardation film 34 remains P-polarized, but the second sub-beam bundle LB having passed through the first retardation film 34 is changed to S-polarized light. For the first retardation film 34, for example, a ½-wave plate can be used. However, the first retardation film 34 is not necessarily be limited to a ½-wave plate, and other wave plates may be used.

The beam bundle LM including the second sub-beam bundle having passed through the first retardation film 34 is incident on the polarization separation element 35. The polarization separation element 35 has wavelength dependence and exhibits a polarization separation property to light in the blue wavelength range. Therefore, the polarization separation element 35 transmits fluorescent light YL having a wavelength band different from blue light, irrespective of the polarization state of the fluorescent light YL. The polarization separation element 35 is disposed so as to form an angle of 45° with respect to the optical axis ax1 and the optical axis ax2. An S-polarized component $BM_{Se}$ of the beam bundle LM of blue light is reflected by the polarization separation element 35 and travels toward the fluorescent light-emitting element 37 to serve as excitation light for a phosphor. A P-polarized component $BM_P$ of the beam bundle LM of blue light passes through the polarization separation element 35 and travels toward the diffusion element 40.

When the proportion of the P-polarized component to the second sub-beam bundle L& is made lower than the proportion of the P-polarized component to the first sub-beam bundle $L_A$ by the action of the first retardation film 34, the intensity of the second sub-beam bundle $L_B$ having passed through the polarization separation element 35 can be lower than the intensity of the first sub-beam bundle $L_A$ having passed through the polarization separation element 35. In this manner, the intensity of the second sub-beam bundle $L_B$ upon incidence of the beam bundle on the diffusion element 40 can be lower than the intensity of the first sub-beam bundle $L_A$ similarly to the first embodiment.

The P-polarized beam bundle $BM_P$ having passed through the polarization separation element 35 is incident on the second retardation film 38. The second retardation film 38 is composed of a ¼-wave plate disposed on the optical path between the polarization separation element 35 and the diffusion element 40. Hence, the beam bundle $BM_P$ having passed through the polarization separation element 35 is converted into a circularly polarized beam bundle $BM_C$ by the second retardation film 38, and then incident on the second pickup optical system 39. The second pickup optical system 39 concentrates the beam bundle $BM_C$ onto the diffusion element 40. The second pickup optical system 39 is composed of, for example, a pickup lens 46.

The diffusion element 40 diffusely reflects the beam bundle $BM_C$ emitted from the second pickup optical system 39 toward the polarization separation element 35. That is, the diffusion element 40 according to the embodiment is a reflective diffusion element unlike the first embodiment. As a specific example of the diffusion element 40, a diffusion element provided with a reflective layer on a surface on the side opposite to the light incident surface of the diffusion element illustrated in the first embodiment can be used.

The beam bundle BM$_C$ diffusely reflected by the diffusion element 40 is incident again on the second retardation film 38 to thereby be converted into a S-polarized beam bundle BM$_{Sd}$, and then is incident on the polarization separation element 35. The S-polarized beam bundle BM$_{Sd}$ is reflected by the polarization separation element 35 and travels toward the integrator optical system 41.

On the other hand, the S-polarized beam bundle BM$_{Se}$ reflected by the polarization separation element 35 is incident on the first pickup optical system 36. The first pickup optical system 36 is composed of, for example, a pickup lens 47 and a pickup lens 48. The first pickup optical system 36 concentrates the incident beam bundle onto a phosphor layer 50.

The fluorescent light-emitting element 37 includes the phosphor layer 50, a substrate 51 that supports the phosphor layer 50, and a fixing member 52 that fixes the phosphor layer 50 to the substrate 51. The phosphor layer 50 is fixed to the substrate 51 with the fixing member 52. The phosphor layer 50 contains a phosphor that is excited by excitation light (beam bundle BM$_{Se}$) at a wavelength of 460 nm. The phosphor receives the excitation light to produce the fluorescent light (yellow light) YL having a peak wavelength in, for example, the range of wavelengths from 500 to 700 nm.

For the phosphor layer 50, a phosphor layer having excellent heat resistance and surface workability is preferably used. As this type of phosphor layer 50, for example, a phosphor layer obtained by dispersing phosphor particles in an inorganic binder such as alumina, a phosphor layer obtained by sintering phosphor particles without using a binder, or the like can be suitably used.

A reflective layer 53 is provided on a surface of the phosphor layer 50 on the side opposite to a surface thereof on which the excitation light is incident. The reflective layer 53 has a function of reflecting the fluorescent light YL produced by the phosphor layer 50. A heat sink 54 is disposed on a surface of the substrate 51 on the side opposite to a surface thereof that supports the phosphor layer 50.

In the fluorescent light YL produced by the phosphor layer 50, a portion of the fluorescent light YL is reflected by the reflective layer 53 and emitted outside the phosphor layer 50. In the fluorescent light YL produced by the phosphor layer 50, another portion of the fluorescent light YL is directly emitted outside the phosphor layer 50 not via the reflective layer 53. In this manner, the fluorescent light YL is emitted from the phosphor layer 50.

The fluorescent light YL emitted from the phosphor layer 50 is unpolarized light whose polarization direction is not aligned. After passing through the first pickup optical system 36, the fluorescent light YL is incident on the polarization separation element 35. As described above, the polarization separation element 35 has a characteristic of transmitting the fluorescent light YL irrespective of the polarization state thereof. Hence, the fluorescent light through the polarization separation element 35 and travels toward the integrator optical system 41.

Due to this, the blue beam bundle BM$_{Sd}$ emitted from the diffusion element 40 and the yellow fluorescent light YL emitted from the fluorescent light-emitting element 37 are combined and converted into white light. The white light is emitted from the illumination device 22 and used as illumination light WL. That is, the beam bundle BM$_{Sd}$ and the fluorescent light YL are emitted in the same direction as each other from the polarization separation element 35. Due to this, the white illumination light WL obtained by combining the beam bundle BM$_{Sd}$ as blue light with the fluorescent light YL as yellow light is obtained.

The illumination light WL emitted from the polarization separation element 35 is incident on the integrator optical system 41. The integrator optical system 41 is composed of a lens array 56 and a lens array 57. Each of the lens array 56 and the lens array 57 has a configuration in which a plurality of lenses are arranged in an array.

The illumination light WL having passed through the integrator optical system 41 is incident on the polarization conversion element 42. The polarization conversion element 42 is composed of a polarization separation film and a retardation film. The polarization conversion element 42 converts the unpolarized fluorescent light into one of the linearly polarized lights, for example, S-polarized light.

The illumination light WL converted into the S-polarized light by the polarization conversion element 42 is incident on the superimposing optical system 43. The superimposing optical system 43 superimposes the illumination light WL emitted from the polarization conversion element 42 in an area to be illuminated. The superimposing optical system 43 is composed of, for example, a superimposing lens. Due to this, an illuminance distribution of light on the liquid crystal panel as the area to be illuminated is uniformed.

Also in the illumination device 22 according to the embodiment, the intensity of the second sub-beam bundle L$_B$ upon incidence of the beam, bundle LM on the diffusion element 40 is lower than the intensity of the first sub-beam bundle L$_A$. Therefore, a wide diffuse angular distribution can be obtained using the diffusion element 40 with a small diffusion characteristic. Similarly to the first embodiment, the intensity of the second sub-beam bundle may be set to 0 or finite values. When the first retardation film 34 is rotatably configured, the intensity of the second sub-beam bundle L$_B$ can be changed by rotating the first retardation film 34 to adjust the angle formed by the fast axis or slow axis of the first retardation film 34 with the polarization axis.

In the projector 21 according to the embodiment, the white light is emitted from the illumination device 22. However, looking at the components of the white light, the blue light originates from the diffused light coming from the diffusion element 40, and the red light and the green light originate from the fluorescent light coming from the fluorescent light-emitting element 37. In general, however, a light distribution is different between fluorescent light and diffused light, and the light distribution of the diffused light is narrower than the light distribution of the fluorescence. As a result, color unevenness due to the difference in light distribution may occur in a projector including this type of illumination device. In contrast, in the projector 21 according to the embodiment, the light distribution of the diffused light can be expanded and brought close to the light distribution of the fluorescence. Therefore, it is possible to implement a projector with less probability of color unevenness and having excellent display quality while reducing a reduction in light use efficiency.

Moreover, it is preferable to satisfy Formula (3).

$$I1/I2 > I3/I4 \qquad (3)$$

where I3 is the intensity of light traveling in a specular direction of the first sub-beam bundle upon reflection of the beam bundle LM on the diffusion element 40, and I4 is the intensity of light traveling in a specular direction of the second sub-beam, bundle upon reflection, of the beam bundle LM on the diffusion element 40.

Due to this, the angular distribution of intensity of the beam bundle emitted from the diffusion element 40 can be gentler than the angular distribution of intensity of the beam bundle incident on the diffusion element 40.

Moreover, in the angular distribution of intensity of the beam bundle reflected by the diffusion element 40, the light traveling in the specular direction of the second sub-beam bundle, that is, the unit beam bundle reflected vertically may be set to a maximum intensity. According to this configuration, diffusion close to Lambert diffusion is obtained.

An output of the semiconductor laser 45 constituting the light source device 33 may be reduced due to deterioration over time. In this case, a diffuse angular distribution may be deviated from a normal usage state depending on the degree of reduction in output. Also in such a case, when the first retardation film 34 is rotatably configured, the diffuse Angular distribution can be adjusted, and thus color unevenness can be reduced.

The embodiment has a configuration in which the first retardation film 34, which is small so as to allow the central portion of the beam bundle to be incident thereon, is used so that only the second sub-beam bundle is incident on the first retardation film 34. Instead of this configuration, the invention may have a configuration in which a first retardation film having a hole through which the central portion of the beam bundle passes is used so that only the first sub-beam bundle is incident on the first retardation film, contrary to the embodiment. In this case, if, for example, a light beam emitted from the semiconductor laser is S-polarized, the first sub-beam bundle at the peripheral portion which passes through the first retardation film is changed to P-polarized light, and the second sub-beam bundle at the central portion which does not pass through the first retardation film remains S-polarized, similar advantageous effects can be obtained with the other optical systems remaining as they are in the embodiment. Alternatively, a retardation film having different phase differences between the central portion and the peripheral portion may be used.

The technical scope of the invention is not limited to the embodiments, and various modifications can be added within the scope not departing from the gist of the invention.

For example, the first embodiment has described an example in which the illumination device using the semiconductor lasers for all colors is combined with the transmissive diffusion element. However, the illumination device using the semiconductor lasers for all colors may be combined with a reflective diffusion element. Moreover, the second embodiment has described an example of the illumination device in which the fluorescent light-emitting element is disposed on the optical path of the reflected light reflected by the polarization separation element and the fluorescent light and the diffused light are combined by the polarization separation element to achieve a size reduction. Instead of this configuration, the invention may be applied to an illumination device in which fluorescent light and diffused light are disposed on different optical paths.

Moreover, the illumination device according to the invention may not necessarily include a condensing optical system. For example, an optical path deflecting element that refracts only the first sub-beam bundle to bend the optical path may be used. Alternatively, an exiting direction of the semiconductor laser located at the periphery may be different from an exiting direction of the semiconductor laser located at the central portion. Also in such cases, as a means of making the intensity of the second sub-beam bundle to be incident on the diffusion element lower than the intensity of the first sub-beam bundle, a method may be adopted in which, for example, an output of each of a plurality of semiconductor lasers is different between the semiconductor laser at the center and the semiconductor laser at the periphery, or the arrangement density of semiconductor lasers is different between the center and the periphery, as described above.

In addition, the shape, number, arrangement, material, and the like of the various components of the illumination device and the projector are not limited to the embodiments but can be appropriately changed. Moreover, although an example of mounting the illumination device according to the invention on the projector has been shown in the embodiments, the invention is not limited to this example. The illumination device according to the invention can be applied also to a luminaire, a headlight of an automobile, or the like.

The entire disclosure of Japanese Patent Application No. 2015-028779, filed on Feb. 17, 2015 is expressly incorporated by reference herein.

What is claimed is:

1. An illumination device comprising:
   a diffusion element; and
   a light source device that emits a beam bundle including a first unit beam bundle to be incident on the diffusion element along a first direction and a second unit beam bundle to be incident on the diffusion element along a second direction, wherein
   an angle formed by the first unit beam bundle with an optical axis of the beam bundle is greater than an angle formed by the second unit beam bundle with the optical axis, and
   the following expression is satisfied:

$$I2<I1$$

where I1 is a non-zero luminous flux set initially for the first unit beam bundle, and I2 is a non-zero luminous flux set initially for the second unit beam bundle.

2. A projector comprising:
   the illumination device according to claim 1;
   a light modulator that modulates, in response to image information, light emitted from the illumination device to thereby form image light; and
   a projection optical system that projects the image light.

3. An illumination device comprising:
   a diffusion element; and
   a light source device that emits a beam bundle including a first unit beam bundle to be incident on the diffusion element along a first direction and a second unit beam bundle to be incident on the diffusion element along a second direction, wherein
   an angle formed by the first unit beam bundle with an optical axis of the beam bundle is greater than an angle formed by the second unit beam bundle with the optical axis, and
   the following expression is satisfied:

$$I2<I1$$

where I1 is a luminous flux of the first unit beam bundle, and I2 is a luminous flux of the second unit beam bundle,
   the beam bundle having passed through the diffusion element includes a third unit beam bundle traveling along the first direction and a fourth unit beam bundle traveling along the second direction, and
   the following expression is satisfied:

$$I1/I2>I3/I4$$

where I3 is a luminous flux of the third unit beam bundle, and I4 is a luminous flux of the fourth unit beam bundle.

4. The illumination device according to claim 3, wherein an intensity of light traveling in the second direction is maximum in an angular distribution of intensity of the beam bundle having passed through the diffusion element.

5. A projector comprising:
the illumination device according to claim 3;
a light modulator that modulates, in response to image information, light emitted from the illumination device to thereby form image light; and
a projection optical system that projects the image light.

6. A projector comprising:
the illumination device according to claim 4;
a light modulator that modulates, in response to image information, light emitted from the illumination device to thereby form image light; and
a projection optical system that projects the image light.

7. An illumination device comprising:
a diffusion element; and
a light source device that emits a beam bundle including a first unit beam bundle to be incident on the diffusion element along a first direction and a second unit beam bundle to be incident on the diffusion element along a second direction, wherein
an angle formed by the first unit beam bundle with an optical axis of the beam bundle is greater than an angle formed by the second unit beam bundle with the optical axis, and
the following expression is satisfied:

$$I2 < I1$$

where I1 is a luminous flux of the first unit beam bundle, and I2 is a luminous flux of the second unit beam bundle,
the beam bundle reflected by the diffusion element includes a third unit beam bundle traveling in a specular direction of the first unit beam bundle and a fourth unit beam bundle traveling in a specular direction of the second unit beam bundle, and
the following expression is satisfied:

$$I1/I2 > I3/I4$$

where I3 is a luminous flux of the third unit beam bundle, and I4 is a luminous flux of the fourth unit beam bundle.

8. The illumination device according to claim 7, wherein an intensity of light traveling in the specular direction of the second unit beam bundle is maximum in an angular distribution of intensity of the beam bundle reflected by the diffusion element.

9. A projector comprising:
the illumination device according to claim 7;
a light modulator that modulates, in response to image information, light emitted from the illumination device to thereby form image light; and
a projection optical system that projects the image light.

10. A projector comprising:
the illumination device according to claim 8;
a light modulator that modulates, in response to image information, light emitted from the illumination device to thereby form image light; and
a projection optical system that projects the image light.

* * * * *